United States Patent
Kikugawa

(10) Patent No.: US 7,411,607 B2
(45) Date of Patent: Aug. 12, 2008

(54) ELECTRONIC EQUIPMENT AND DATA TRANSFER METHOD

(75) Inventor: Noriyuki Kikugawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1305 days.

(21) Appl. No.: 10/390,260

(22) Filed: Mar. 17, 2003

(65) Prior Publication Data

US 2003/0189644 A1    Oct. 9, 2003

(30) Foreign Application Priority Data

Mar. 19, 2002    (JP)    ............... 2002-077030

(51) Int. Cl.
*H04N 5/225*    (2006.01)

(52) U.S. Cl. .................................. 348/207.2

(58) Field of Classification Search ............. 348/207.2, 348/207.99, 211.1, 211.2, 333.13
See application file for complete search history.

(56) References Cited

U.S. PATENT DOCUMENTS 6,904,532 B2 *    6/2005    Matsumoto .................. 713/320
7,265,780 B2 *    9/2007    Tanaka et al. ........... 348/207.99

FOREIGN PATENT DOCUMENTS

| JP | 09-305508 A | 11/1997 |
| JP | 10-117302 A | 5/1998 |
| JP | 2001-356846 A | 12/2001 |
| JP | 2003-174610 A | 6/2003 |

* cited by examiner

*Primary Examiner*—Tuan V Ho
(74) *Attorney, Agent, or Firm*—Cowan, Liebowitz & Latman, P.C.

(57) ABSTRACT

Since cable external equipment has the advantage over radio external equipment, data is transferred through a cable when active cable external equipment exists, and data is automatically transferred to radio external equipment when active cable external equipment does not exist.

4 Claims, 7 Drawing Sheets

ELECTRONIC EQUIPMENT AND DATA TRANSFER METHOD

BACKGROUND OF THE INVENTION

1. Field of the Invention

The present invention relates to electronic equipment provided with at least two cable and radio interfaces.

2. Description of the Related Art

Recently, local radio systems such as Bluetooth, IEEE 802.11, etc. have become popular, and electronic equipment provided with a radio interface and a conventional cable interface has been presented. For example, a digital camera and a PDA provided with a Bluetooth radio interface, and a USB cable interface, etc. have been popularized on the market. External connection equipment for the above mentioned electronic equipment can be, for example, equipment of the same type having a different interface such as a BLUETOOTH printer, a USB printer, etc., equipment provided with both Bluetooth and USB interfaces, etc.

However, when the electronic equipment provided with both radio interface and cable interface as described above is connected to external connection equipment provided with a radio interface or external connection equipment provided with a cable interface, the operator has to be constantly aware which type of interface is to be connected. For example, when the same type of external equipment can be simultaneously connected (for example, a USB printer and a BLUETOOTH printer can be available), it is necessary to determine which external equipment is to be connected. When there are the same types of external connection equipment via radio or cable (for example, a radio printer and a cable printer), the operator has to be aware which interface is connected to the external equipment.

SUMMARY OF THE INVENTION

The present invention has been developed to solve the above mentioned problems, and aims at providing electronic equipment which is provided with both radio interface and cable interface, and can realize automatic selection and connection with small power consumption without forcing an operator to be aware of an interface to be connected with external connection equipment.

To attain the above mentioned purpose, the present invention.

DETAILED DESCRIPTION OF THE PREFERRED EMBODIMENTS

The embodiments of the present invention are described below by referring to the attached drawings.

First Embodiment

Figure 2A:
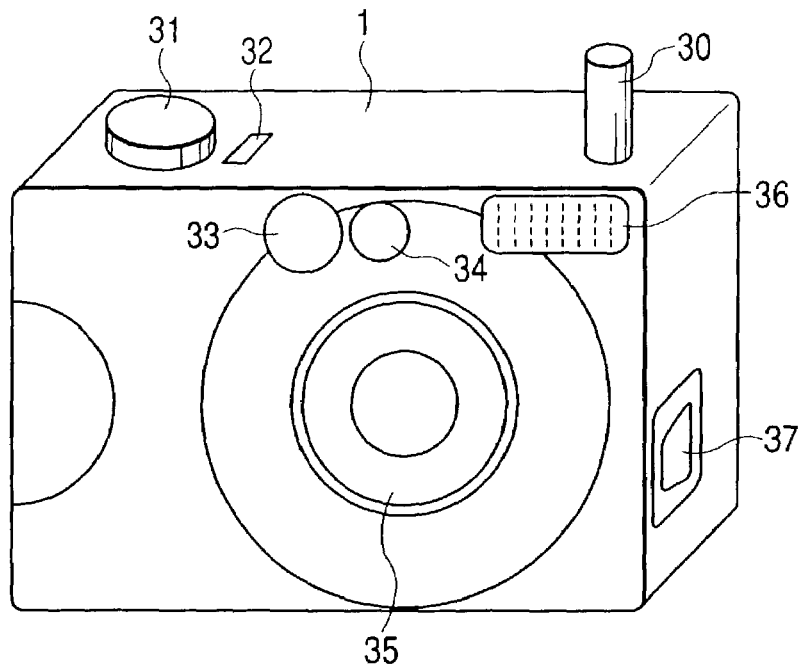
FIGS. 2A and 2B are respectively oblique front and back views of an embodiment of a digital camera as the electronic equipment according to the present invention.
Figure 2B:
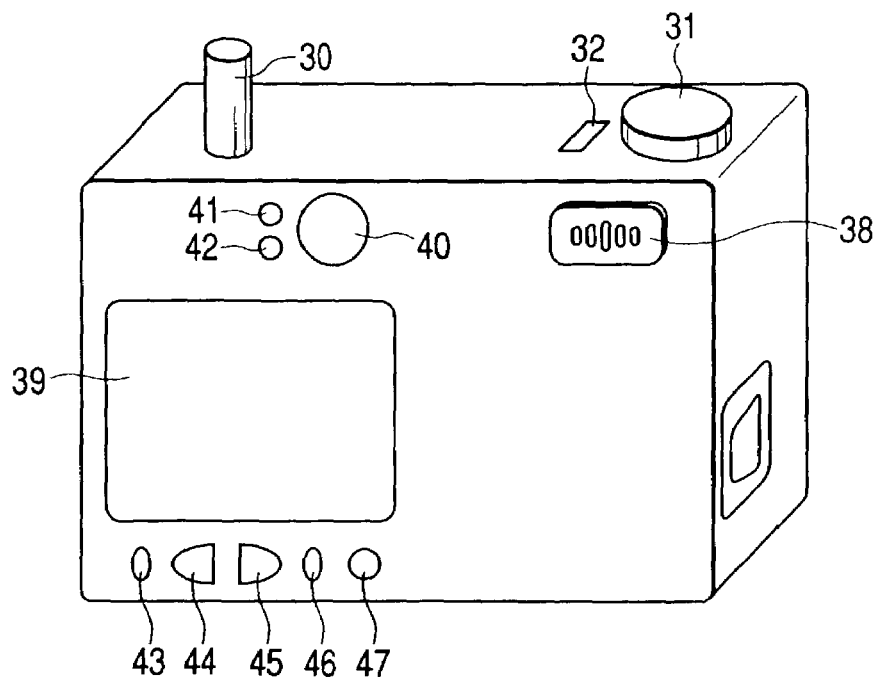

FIGS. 2A and 2B are oblique views of an embodiment of a digital camera as electronic equipment according to the present invention. FIG. 2A is a front view of the camera. FIG. 2B is a back view of the camera. In the present embodiment, a digital camera is described as electronic equipment, a printer as external connection equipment, BLUETOOTH as a radio interface, and USB as a cable interface. With the configuration, the operations from the digital camera to the printer are described below.

In FIGS. 2A and 2B, the camera comprises an antenna 30 for radio transmission and reception, a shutter 31, a power switch 32, a finder window 33, a distance measure unit 34, an up-and-down lens 35, a stroboscope 36, a USB connector 37, a mode switch 38 for switching various operation modes, that is, a shooting mode, a replay mode, and a transfer mode, and a liquid crystal display 39 for displaying an image and a status in each mode.

The camera also comprises a finder eyepiece 40, LED lamps 41 and 42 for indicating the status and the alarm of a digital camera 1, and operation buttons 43 to 47. Especially, the operation button 43 functions as a printing start button to indicate the start of printing in a printing mode, and the operation buttons 44 and 45 function as image selection buttons for selection of an image in the replay mode and the transfer mode.

Figure 1:
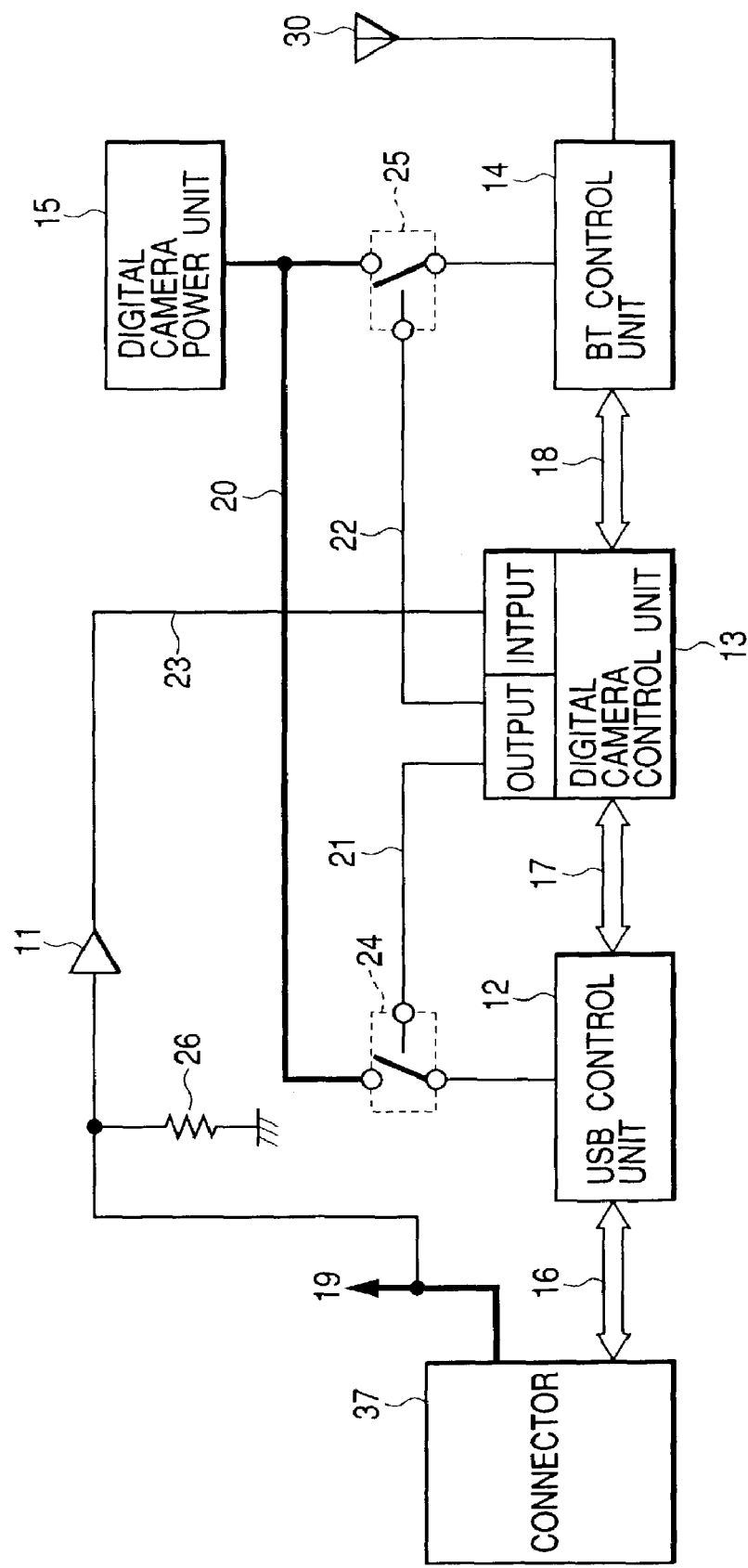
FIG. 1 shows the outline of a block diagram of the body of the digital camera according to the first embodiment of the electronic equipment of the present invention.

FIG. 1 shows the schematic block diagram of the body of a digital camera, and only shows the portions related to the present invention. In FIG. 1, the USB connector 37 is also described by referring to FIG. 2. A USB control unit 12 is connected to the USB connector 37 through a USB signal 16. USB equipment can be host equipment and device equipment, but the digital camera 1 is device equipment and connected to a power supply 19 provided by the USB host equipment through the USB connector 37.

The power supply 19 is connected to a buffer 11, and grounded to the GND through a resistance 26. An output terminal is connected to an input port 23 of a digital camera control unit 13 described later. Through the resistance 26, the input of the buffer 11 is fixed at a low level and 0 is input to the input port 23 when there is no USB host equipment or when it is not active. On the other hand, when there is USB host equipment and is connected to the power supply 19, the input of the buffer 11 is fixed at a high level, and 1 is input to the input port 23.

The digital camera control unit 13 performs primary control of the digital camera, comprises output ports 21 and 22, and the input port 23, and is connected to the USB control unit 12 through a system bus 17. A BT control unit 14 controls BLUETOOTH, and transmits/receives radio data through the connected antenna 30. The BT control unit 14 is connected to the digital camera control unit 13 through a serial bus 18.

A digital camera power unit 15 is configured by a battery, a DC-DC converter, etc. not shown in the attached drawings, and supplies power to each unit of the digital camera 1. FIG. 1 only shows a power supply 20 relating to the present invention. The power supply 20 is connected to the terminals of switches 24 and 25. Another terminal of the switch 24 is connected to the power input of the USB control unit 12, and another terminal of the switch 25 is connected to a power input of the BT control unit 14. Furthermore, the output port 21 of the digital camera control unit 13 is connected to the control terminal of the switch 24, and the output port 22 is connected to the control terminal of the switch 25, thereby controlling the power ON/OFF of the switches 24 and 25.

Described below is the method of operating the digital camera with the above mentioned configuration.

After or before turning on the digital camera 1 by the power switch 32, the mode switch 38 is set to the shooting mode, and the shutter 31 is operated while confirming an image to be captured on the liquid crystal display 39 or the finder eyepiece 40, thereby shooting the image. The captured image can be immediately displayed on the liquid crystal display 39.

Furthermore, after or before turning on the digital camera 1 by the power switch 32, the mode switch 38 is set to the replay mode, thereby displaying and allowing the user to view a captured image on the liquid crystal display 39. The displayed image can be switched by the operation buttons 44 and 45.

Furthermore, after or before turning on the digital camera 1 by the power switch 32, the mode switch 38 is set to the transfer mode, thereby entering a mode in which an image can be printed according to the present invention. The operation buttons 44 and 45 of the digital camera 1 are operated to switch captured images displayed on the liquid crystal display 39. Then, the printing start button 43 is operated to transmit print data to the printer.

Figure 3:
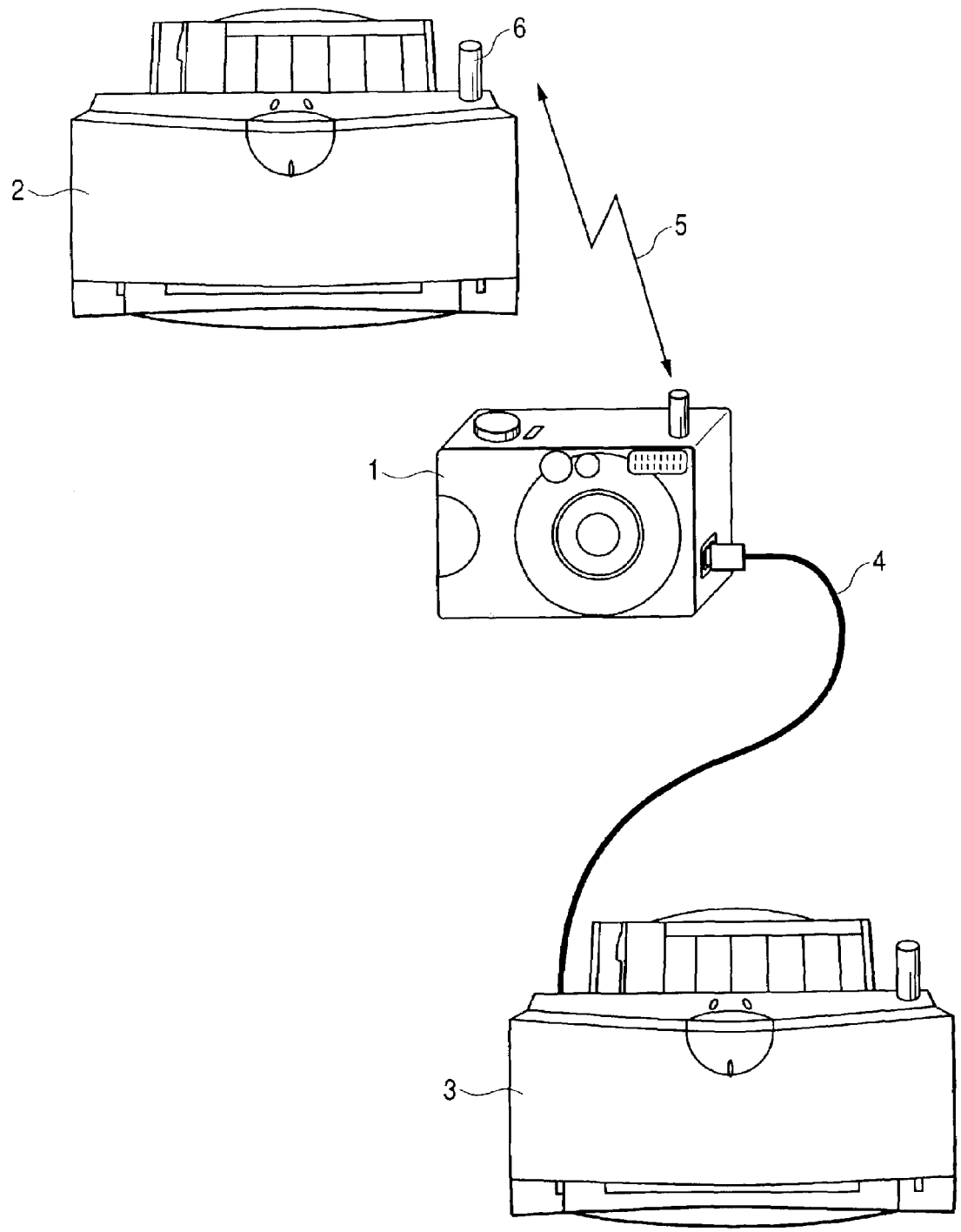
FIG. 3 shows the appearance for explanation of the connection according to the first and second embodiments.

FIG. 3 is an explanatory view of transmitting print data from a digital camera to a printer. FIG. 3 shows the digital camera 1, a printer 2 for BLUETOOTH connection (hereinafter referred to as a BT printer), an antenna 6 for the BT printer 2, a radio connection 5, a USB printer 3, and a USB cable 4 for connection of the USB connector 37 of the digital camera 1 to the USB connector (not shown) of the USB printer 3.

Figure 4:
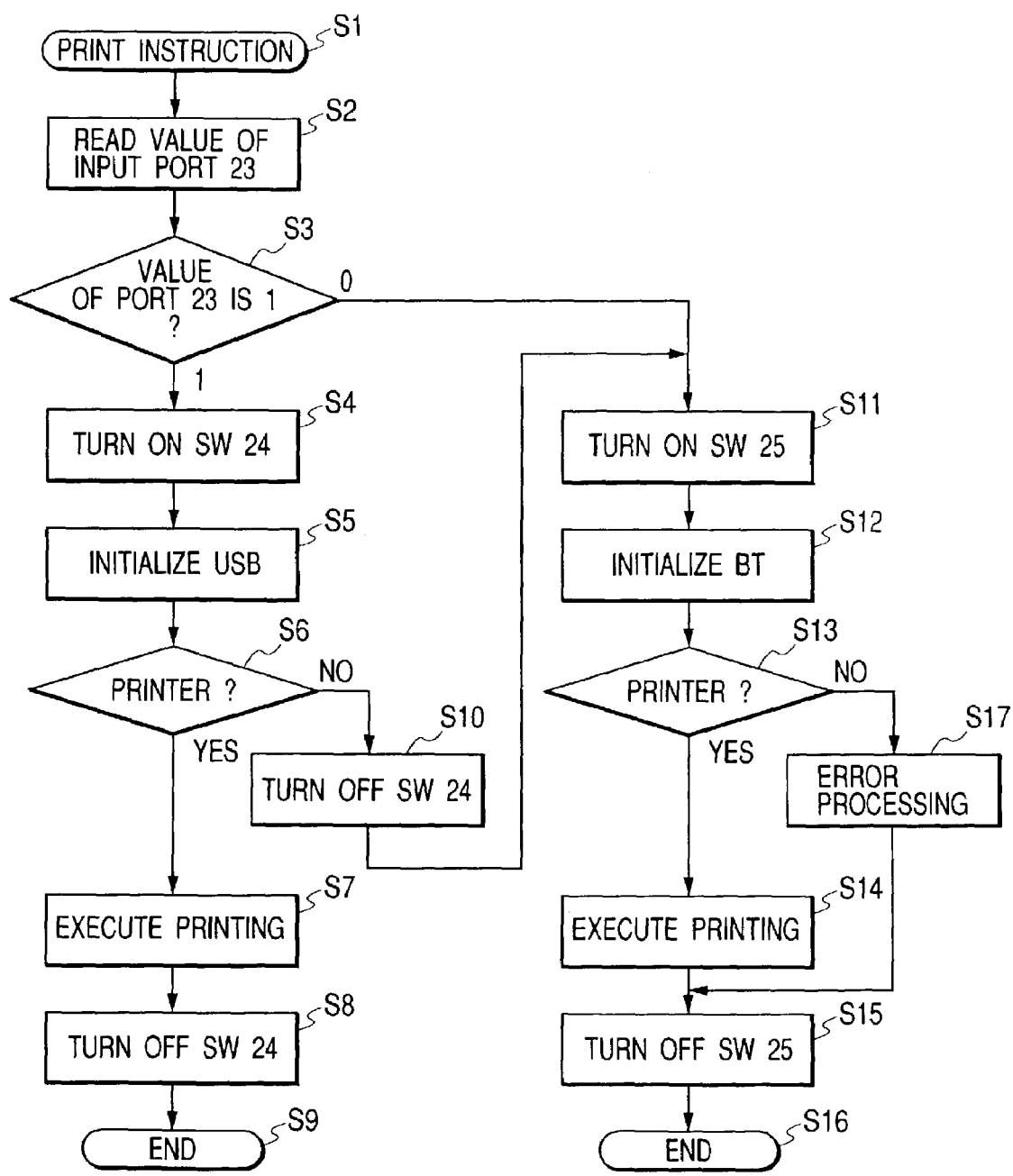
FIG. 4 is a flowchart for explanation of the operations according to the first embodiment of the present invention.

FIG. 4 is a flowchart for explanation of the operations according to the first embodiment of the present invention. The flowchart shows the flow of the process of a printing unit started by the operator setting the digital camera to the printing mode, selecting a transfer image, and then pressing the transferring start button 43.

First, upon receipt of a print instruction, the digital camera 1 starts the flowchart in step S1. In step S2, the value of the input port 23 shown in FIG. 1 is read. In step S3, the read value is checked. Through the port, the status of the USB host equipment connected to the USB connector 37 is obtained. That is, if the value of the input port 23 is 1, it is determined that active USB host equipment is connected, and procedure is passed to step S4. If the value is 0, it is determined that the USB host equipment is not connected, or not active although it is connected, and procedure is passed to step S22 (step S3).

In step S4, the output port 21 is operated and the switch 24 is turned on, and the power supply 20 is connected to the USB control unit 12. Then, in step S5, the USB control unit 12 is initialized. In step S6, a negotiation is started with the connected USB host equipment to determine whether or not the USB host equipment is a printer. If it is a printer (the USB printer 3 shown in FIG. 3), then procedure is passed to step S7, the print data is transferred via the USB, and the USB printer 3 performs printing. When the printing process terminates in step S7, the output port 21 is operated in step S8, the switch 24 is turned off, the power supply 20 to the USB control unit 12 is stopped, and then the process terminates (step S9).

Described above is the printing process when an active USB printer is connected. If the input port 23 is 0 in step S3, that is, if it is determined that the USB host equipment is not connected, or it is not active although it is connected, procedure is branched to step S11. Also when it is determined that the USB host equipment connected in step S6 is not a printer, the switch 24 is turned off and procedure is branched to step S11. In step S11, the output port 22 is operated and the switch 25 is turned on, and the power supply 20 is connected to the BT control unit 14.

After the BT control unit 14 is initialized in step S12, the printer (BT printer 2 shown in FIG. 3) is searched for in step S13. If the BT printer 2 is detected in step S13, then print data is transferred via BLUETOOTH in step S14, and the printing process is performed by the BT printer 2. When the printing process is completed in step S14, the output port 22 is operated in step S15, the switch 25 is turned off, the power supply 20 to the BT control unit 14 is stopped, and then the process terminates (step S16).

Described above is the printing process performed when no active USB printer is detected, and the BT printer 2 is detected. When the BT printer is not detected in step S13, an error process is performed in step S17. It is an error condition that no printing process can be performed in response to a print instruction from an operator because no printer can be detected. Therefore, a print error notification is displayed on the liquid crystal display 39 of the digital camera 1 for the operator. Then, procedure is passed to step S15, the port 22 is operated, the switch 25 is turned off, the power supply 20 to the BT control unit 14 is stopped, and then the process terminates (step S16).

As described above, the digital camera is configured to comprise two types of interfaces, that is, a USB interface and a BLUETOOTH interface, means for detecting the presence of a USB printer, and means for detecting the presence of a BT printer, and to prioritize the USB printer. Therefore, the printing process can be automatically performed by the USB printer when an active USB printer is connected, and by the BLUETOOTH printer when an active USB printer is not connected.

That is, the printing process can be automatically performed by an appropriate printer in the same printing operation without the operator being aware of an appropriate interface. Thus, although both USB printer and BLUETOOTH printer are active, it is not necessary to select an appropriate printer. When there are no active USB or BLUETOOTH printers, a print error notification can be returned to the operator.

Furthermore, since power is supplied to the control unit of the USB or BLUETOOTH interface actually used in the printing process, battery-driven equipment such as a digital camera can be realized with small power consumption.

Second Embodiment

According to the first embodiment, the power supply 19 provided by the USB cable 4 is read by the input port 23 through the buffer 11, and controls the turning ON/OFF of the switch 24. The switch 24 can be directly controlled using the power supply 19.

Figure 5:
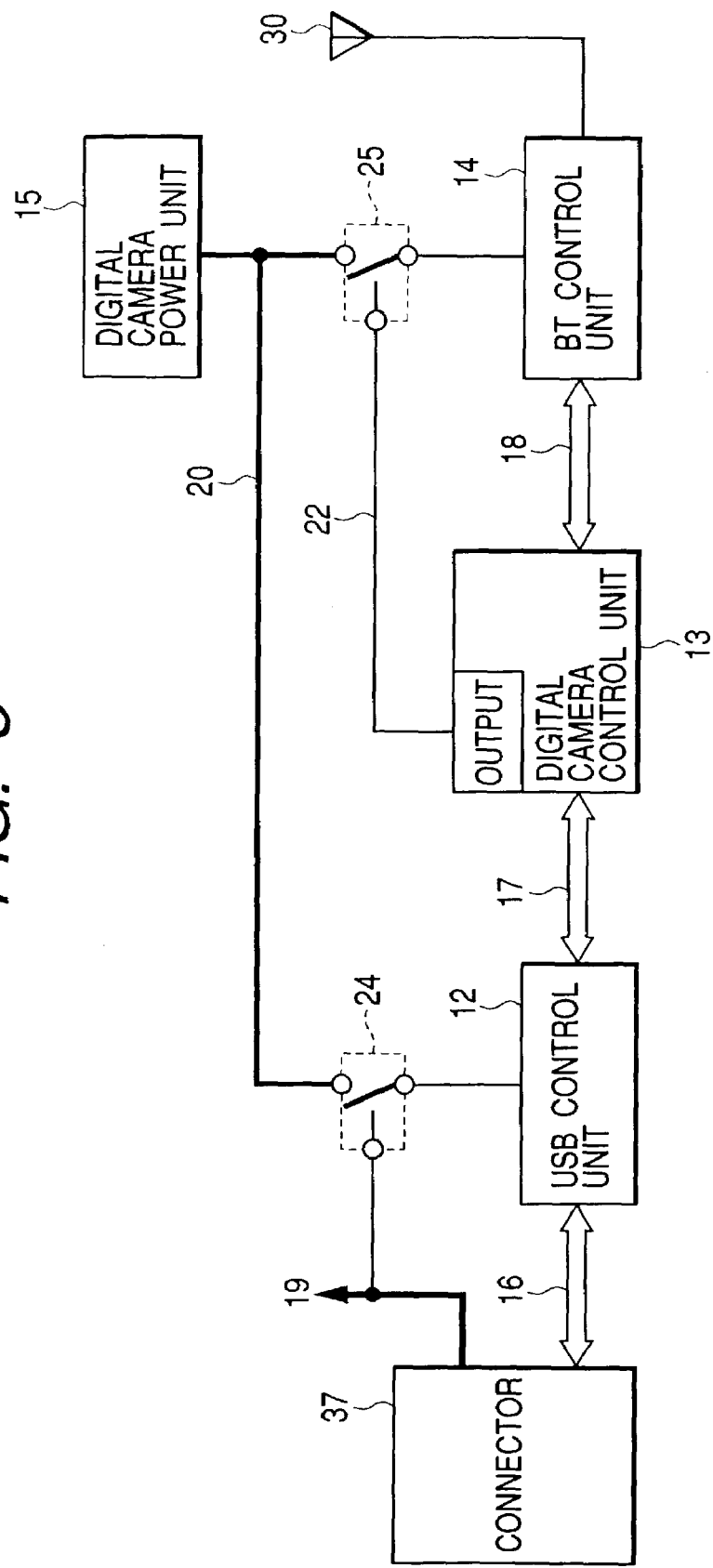
FIG. 5 shows the schematic block diagram of the body of the digital camera according to the second embodiment of the present invention.

FIG. 5 is the schematic block diagram for explanation of the second embodiment of the present invention. In FIG. 5, the portion having the same function as in the first embodiment is assigned the same reference numeral. The switch 24 which has been controlled by the output port 21 is controlled by the power supply 19, and the buffer 11, the output port 21, the input port 23, and the resistance 26 are not required.

Figure 6:
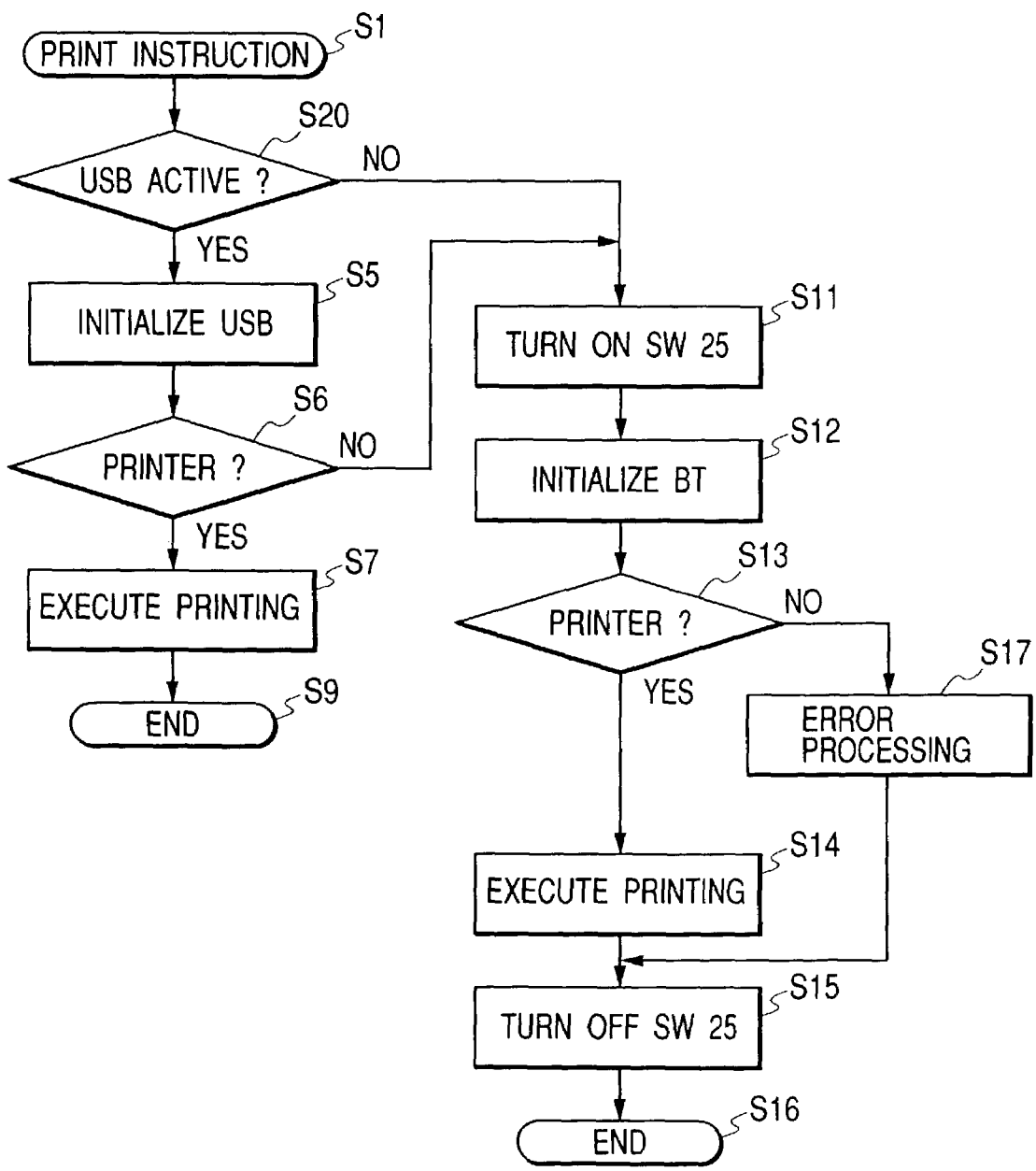
FIG. 6 is a flowchart for explanation of the operations according to the second embodiment of the present invention.

FIG. 6 is a flowchart for explanation of the operations according to the second embodiment. As in the first embodiment, the flowchart shows the flow of the process of a printing unit started by the operator setting the digital camera in the printing mode, selecting a transfer image, and then pressing the transferring start button 43. The same processing as FIG. 4 that is a flowchart of the first embodiment is depicted by the same sign. Upon receipt of a print instruction, the digital camera 1 starts the flowchart from step S1. In step S20, it attempts to establish the communications with the USB control unit 12 through the system bus 17 to check whether or not power is supplied to the USB control unit 12 and makes it active.

If it is active, procedure is passed to step S5. If it is not active, procedure is branched to step S11. In step S6, the digital camera negotiates with the USB host equipment to determine whether or not the USB host equipment is a printer. If it is a printer (the USB printer 3 shown in FIG. 3), procedure is passed to step S7, and print data is transferred through the USB interface. If it is not a printer, procedure is branched to step S11. Upon completion of the printing process in step S7, the process terminates in step S9.

Described above is the printing process performed when an active USB printer is connected. When it is determined in step S20 that the USB control unit is not active, and when it is determined in step S6 that the USB host equipment is not a printer, procedure is branched to step S11 to perform the following steps. Since the processes in and after step S11 are the same as those in the first embodiment, the explanation is omitted here.

As described above, the digital camera is configured to comprise two types of interfaces, that is, a USB interface and a BLUETOOTH interface, means for detecting the presence of a USB printer, and means for detecting the presence of a BT printer, and to prioritize the USB printer. Therefore, the printing process can be automatically performed by the USB printer when an active USB printer is connected, and by the BLUETOOTH printer when an active USB printer is not connected.

That is, the printing process can be automatically performed by an appropriate printer in the same printing operation without the operator being aware of an appropriate interface. Thus, although both USB printer and BLUETOOTH printer are active, it is not necessary to select an appropriate printer. When there are no active USB or BLUETOOTH printers, a print error notification can be returned to the operator.

Furthermore, since power is supplied to the control unit of the USB or BLUETOOTH interface actually used in the printing process, battery-driven equipment such as a digital camera can be realized with small power consumption.

Third Embodiment

In the first and second embodiments, the USB printer 3 and the BT printer 2 are exemplified as shown in FIG. 3. In the third embodiment, a printer provided with both USB and BLUETOOTH interfaces is exemplified.

The present embodiment is explained below by referring to the attached drawings, but the same portions as in the first and second embodiments are assigned the same reference numerals, and only different portions from the first and second embodiments are explained below.

Figure 7:
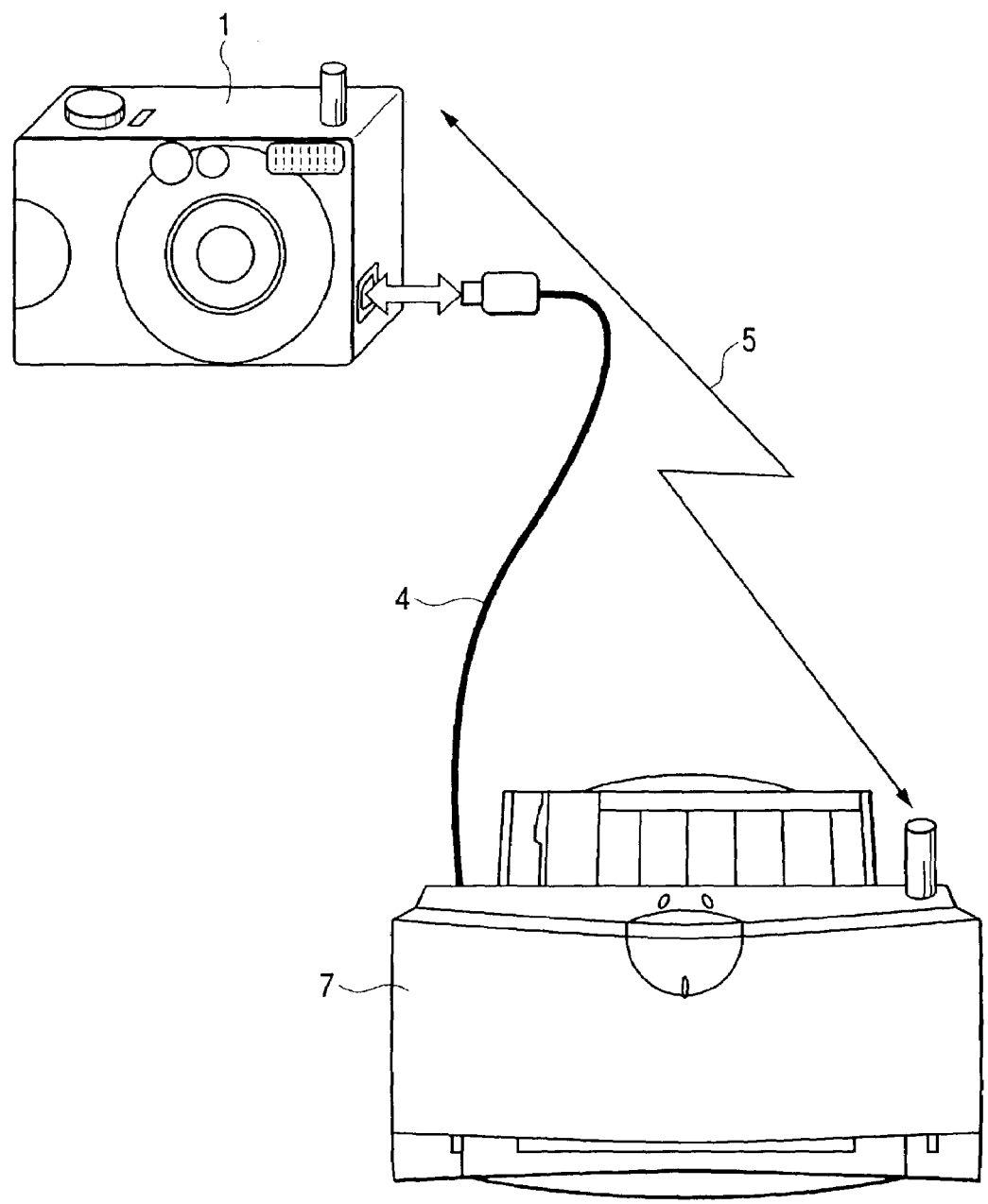
FIG. 7 shows the appearance for explanation of the connection according to the third embodiment of the present invention.

FIG. 7 shows print data transmission from a digital camera to a printer. FIG. 7 shows the digital camera 1, a printer 7 having both USB and BLUETOOTH interfaces, the radio connection 5 image, the USB cable 4 for connection of the USB connector 37 of the digital camera 1 to the USB connector (not shown in the attached drawings) of the printer 7.

After the operator turns on the printer 7, operates the digital camera 1, and issues a print instruction, the digital camera 1 searches for USB host equipment. If it can be detected, a printing process is performed via the USB. If it cannot be detected, the printing process is performed via the BLUETOOTH. That is, when the digital camera 1 and the printer 7 are connected through the USB cable 4, the printing process is performed via the USB. When the USB cable 4 is not connected, the printing process is performed via the BLUETOOTH.

Therefore, when the operator works beside the printer 7, operates the digital camera 1, and performs a printing process, the USB cable 4 is connected and the printing process is performed via the USB. If the operator does not work beside the printer 7, and the USB cable 4 is inoperable, the printing process is performed via the BLUETOOTH. Thus, the above mentioned automatic selection can be performed in the same operation without the operator being aware of an interface to be connected.

Fourth Embodiment

According to the first and second embodiments, when the USB printer 3 is active, a printing process is performed unconditionally via the USB. However, with the configuration, the printing process is performed on the USB printer 3 although a no-ink or no-printing-paper error arises on the USB printer 3, thereby causing a printing error. Therefore, in step S6 shown in FIGS. 4 and 6, it is determined whether or not the USB host equipment is a printer, and also an error status is checked when the USB host equipment is a printer so that a branch can be made although an error occurs (procedure is passed to step S10 in FIG. 4, and to step S11 in FIG. 6). As a result, a further effect can be obtained.

That is, when a no-ink of no-printing-paper error occurs on the USB printer 3, a printing error can be avoided by automatically performing a printing process on the BT printer 2.

Other Embodiments

In explaining the printing process according to each of the above mentioned embodiments, a digital camera is used as electronic equipment, and a printer as external connection equipment. However, the printing process can be applied from various types of electronic equipment such as a PDA, a mobile phone, a personal computer, etc. to a printer. Furthermore, external connection equipment can be external memory, a PDA, a mobile phone, a personal computer, etc. With the above mentioned external equipment, the operation is not a printing process by a printer, but any of various operations such as a file transfer, etc.

Furthermore, although a BLUETOOTH radio interface is exemplified above, the present invention can also be applied to a radio interface such as IEEE 802.11, etc. Additionally, although a USB cable interface is exemplified above, it is not limited to the USB. For an interface that is not the interface such as a USB interface to which power is supplied from external connection equipment, a power line is not monitored, but that an interface line is active can be directly monitored.

As described above, according to the embodiments of the present invention, the electronic equipment provided with at least two cable and radio interfaces comprises means for automatically switching between cable and radio, and means for detecting external equipment connected by a cable, and the cable external equipment has the advantage over radio external equipment. Therefore, data is transferred through a cable when active cable external equipment exists, and data is automatically transferred to radio external equipment when active cable external equipment does not exist. That is, data can be automatically transferred to an appropriate in the same operation without the operator being aware of an interface to be connected. Thus, although both cable external equipment and radio external equipment are active, it is not necessary to select one of them for connection.

Furthermore, since means for determining the type of radio external equipment or cable external equipment is provided, equipment for automatically transferring data to appropriate external equipment can be realized.

Additionally, since power can be supplied only to a control unit of a cable or radio interface actually used in data transfer, the electronic equipment can be operated with small power consumption.

Additionally, since power can be supplied only to a control unit of a cable or radio interface actually used in data transfer, the electronic equipment of small power consumption can be realized. Furthermore, data can be transferred without considering an appropriate interface.

What is claimed is:

1. Electronic equipment, comprising:
  a determination unit configured to determine in response to a print instruction whether or not an active wired device is connected to said electronic equipment; and
  an execution unit configured to perform a printing process, wherein when said determination unit determines that the active wired device is connected to said electronic equipment, said execution unit serves to:
  (a) supply power to a wired device control unit;
  (b) determine whether the active wired device is a printer; and
  (c-1) if it is determined that the active wired device is a printer, perform the printing process and then stop power supply to the wired device control unit, or
  (c-2) if it is determined that the active wired device is not a printer, stop power supply to the wired device control unit, supply power to a wireless device control unit, search for a wireless printer, and if a wireless printer is detected, perform the printing process and then stop power supply to the wireless device control unit, or if no wireless printer is detected, perform an error process and then stop power supply to the wireless device control unit, and
  wherein when said determination unit determines that no active wired device is connected to said electronic equipment, said execution unit serves to:
  (d) supply power to the wireless device control unit;
  (e) search for a wireless printer; and
  (f-1) if a wireless printer is detected, perform the printing process and then stop power supply to the wireless device control unit; or
  (f-2) if no wireless printer is detected, perform an error process and then stop power supply to the wireless device control unit.

2. A printing method, comprising:
  a determining step of determining in response to a print instruction whether or not an active wired device is connected to an electronic equipment; and
  an executing step of performing a printing process, wherein when it is determined in said determining step that the active wired device is connected to said electronic equipment, said execution step serves to:
  (a) supply power to a wired device control unit;
  (b) determine whether the active wired device is a printer; and
  (c-1) if it is determined that the active wired device is a printer, perform the printing process and then stop power supply to the wired device control unit, or
  (c-2) if it is determined that the active wired device is not a printer, stop power supply to the wired device control unit, supply power to a wireless device control unit, search for a wireless printer, and if a wireless printer is detected, perform the printing process and then stop power supply to the wireless device control unit, or if no wireless printer is detected, perform an error process and then stop power supply to the wireless device control unit, and
  wherein when said determining step determines that no active wired device is connected to said electronic equipment, said execution step serves to:
  (d) supply power to the wireless device control unit;
  (e) search for a wireless printer; and
  (f-1) if a wireless printer is detected, perform the printing process and then stop power supply to the wireless device control unit; or
  (f-2) if no wireless printer is detected, perform an error process and then stop power supply to the wireless device control unit.

3. Electronic equipment according to claim 1, wherein when said determination unit determines that the active wired device is connected to said electronic equipment, said execution unit serves to:
  (a) supply power to the wired device control unit;
  (b) determine whether the active wired device is a printer and whether the printer is in an error status; and
  (c-1) if it is determined that the active wired device is a printer and that the printer is not in an error status, perform the printing process and then stop power supply to the wired device control unit, or
  (c-2) if it is determined that the active wired device is not a printer or that the printer is in an error status, stop power supply to the wired device control unit, supply power to the wireless device control unit, search for a wireless printer, and if a wireless printer is detected, perform the printing process and then stop power supply to the wireless device control unit, or if no wireless printer is detected, perform an error process and then stop power supply to the wireless device control unit, and
  wherein when said determination unit determines that no active wired device is connected to said electronic equipment, said execution unit serves to:
  (d) supply power to the wireless device control unit;
  (e) search for a wireless printer; and
  (f-1) if a wireless printer is detected, perform the printing process and then stop power supply to the wireless device control unit; or
  (f-2) if no wireless printer is detected, perform an error process and then stop power supply to the wireless device control unit.

4. A printing method according to claim 2 wherein when said determining step determines that the active wired device is connected to said electronic equipment, said execution step serves to:
  (a) supply power to the wired device control unit;
  (b) determine whether the active wired device is a printer and whether the printer is in an error status; and
  (c-1) if it is determined that the active wired device is a printer and that the printer is not in an error status, perform the printing process and then stop power supply to the wired device control unit, or
  (c-2) if it is determined that the active wired device is not a printer or that the printer is in an error status, stop power supply to the wired device control unit, supply power to the wireless device control unit, search for a wireless printer, and if a wireless printer is detected, perform the printing process and then stop power supply to the wireless device control unit, or if no wireless printer is detected, perform an error process and then stop power supply to the wireless device control unit, and wherein when said determining step determines that no active wired device is connected to said electronic equipment, said execution step serves to:

(d) supply power to the wireless device control unit;
(e) search for a wireless printer; and
(f-1) if a wireless printer is detected, perform the printing process and then stop power supply to the wireless device control unit; or
(f-2) if no wireless printer is detected, perform an error process and then stop power supply to the wireless device control unit.

* * * * *